United States Patent
Oya et al.

(10) Patent No.: US 10,122,177 B2
(45) Date of Patent: Nov. 6, 2018

(54) POWER SUPPLY METHOD AND POWER SUPPLY SYSTEM

(71) Applicant: TOYOTA JIDOSHA KABUSHIKI KAISHA, Toyota-shi, Aichi-ken (JP)

(72) Inventors: Ryosuke Oya, Miyoshi (JP); Hiromu Saito, Toyota (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 92 days.

(21) Appl. No.: 15/435,830

(22) Filed: Feb. 17, 2017

(65) Prior Publication Data

US 2017/0240050 A1    Aug. 24, 2017

(30) Foreign Application Priority Data

Feb. 22, 2016  (JP) .................................. 2016-030649

(51) Int. Cl.
*B60L 3/00*    (2006.01)
*H02J 3/38*    (2006.01)
(Continued)

(52) U.S. Cl.
CPC ............ *H02J 3/387* (2013.01); *B60L 3/0046* (2013.01); *B60L 3/0053* (2013.01); *B60L 3/0061* (2013.01); *B60L 3/04* (2013.01); *B60L 7/18* (2013.01); *H01M 8/04302* (2016.02); *H01M 8/04686* (2013.01); *H01M 10/48* (2013.01); *H01M 16/006* (2013.01); *H02J 9/061* (2013.01); *B60L 2240/54* (2013.01); *B60L 2240/547* (2013.01); *H01M 2008/1095* (2013.01); *H01M 2220/20* (2013.01);
(Continued)

(58) Field of Classification Search
CPC ............................... H02J 3/387; B60L 3/0053
See application file for complete search history.

(56) References Cited

U.S. PATENT DOCUMENTS

| 6,793,027 B1* | 9/2004 | Yamada | .................. B60K 1/04 180/65.1 |
| 2007/0054165 A1* | 3/2007 | Yoshida | .................. B60K 6/46 429/415 |

(Continued)

FOREIGN PATENT DOCUMENTS

| JP | 2006-074870 | 3/2006 |
| JP | 2006-294554 | 10/2006 |

(Continued)

*Primary Examiner* — Daniel Cavallari
(74) *Attorney, Agent, or Firm* — Finnegan, Henderson, Farabow, Garrett & Dunner, LLP

(57) ABSTRACT

A power supply method carried out in a system that includes a fuel cell, a secondary battery, a motor, and an auxiliary for the fuel cell includes controlling an intermittent operation by which execution and stoppage of power generation by the fuel cell is switched intermittently to supply power to electric power loads including the motor and the auxiliary, determining whether or not an abnormality occurs in the secondary battery during the intermittent operation, instructing the motor to regenerate power on a condition that it is determined that an abnormality occurs in the secondary battery in the determination of whether or not the abnormality occurs, and supplying power, which is obtained by carrying out the regeneration, to the auxiliary.

10 Claims, 2 Drawing Sheets

(51) Int. Cl.
*H01M 8/04302* (2016.01)
*B60L 3/04* (2006.01)
*H01M 10/48* (2006.01)
*H01M 16/00* (2006.01)
*H02J 9/06* (2006.01)
*B60L 7/18* (2006.01)
*H01M 8/04664* (2016.01)
*H01M 8/1018* (2016.01)

(52) U.S. Cl.
CPC .......... *H01M 2250/20* (2013.01); *Y02T 90/32* (2013.01); *Y02T 90/34* (2013.01)

(56) References Cited

U.S. PATENT DOCUMENTS

2008/0096057 A1 4/2008 Bono
2015/0017485 A1 1/2015 Manabe et al.

FOREIGN PATENT DOCUMENTS

| JP | 2009-089536 | 4/2009 |
| JP | 2011-36101 | 2/2011 |
| WO | WO 2013/099009 A1 | 7/2013 |

\* cited by examiner

POWER SUPPLY METHOD AND POWER SUPPLY SYSTEM

INCORPORATION BY REFERENCE

The disclosure of Japanese Patent Application No. 2016-030649 filed on Feb. 22, 2016 including the specification, drawings and abstract is incorporated herein by reference in its entirety.

BACKGROUND

1. Technical Field

The disclosure relates to a power supply method and a power supply system.

2. Description of Related Art

A power supply system structured by using a fuel cell has attracted attention. The fuel cell includes an anode, to which fuel gas containing hydrogen gas is supplied, and a cathode to which air is supplied, and generates electricity as a result of an electrochemical reaction of the fuel gas and oxidizing gas. Japanese Patent Application Publication No. 2011-036101 (JP 2011-036101 A) discloses a power supply system in which a fuel cell is used.

The electric vehicle in which the power supply system is mounted is able to switch power supplies from the fuel cell and a secondary battery as necessary. For example, depending on output requirements of a traction motor and auxiliaries of the fuel cell, and an amount of charge in the secondary battery, it is possible to switch between power supply from the fuel cell and the secondary battery, and power supply only from the secondary battery. While power is supplied only from the secondary battery, the fuel cell stops generating electricity. Therefore, the fuel cell operates intermittently. This kind of power supply is thus called an intermittent operation.

SUMMARY

There are instances where an abnormality occurs in the secondary battery during the intermittent operation, and the secondary battery is thus not able to supply power. In such a case, it is necessary to drive a traction motor using power from the fuel cell. However, it is required to supply power to auxiliaries that are necessary to change the fuel cell from a non-power generating state to a power generating state. Meanwhile, since there is an abnormality occurring in the secondary battery, it is not possible to receive power supply from the secondary battery for driving the auxiliaries. As a result, the electric vehicle may not be able to continue traveling.

The disclosure provides a technology that enables a fuel cell to restart power generation even when an abnormality occurs in a secondary battery during an intermittent operation.

A power supply method according to the first aspect of the disclosure is carried out in a system that includes a fuel cell, a secondary battery, a motor, and an auxiliary for the fuel cell. The power supply method includes controlling an intermittent operation by which execution and stoppage of power generation by the fuel cell is switched intermittently to supply power to electric power loads including the motor and the auxiliary, determining whether or not an abnormality occurs in the secondary battery during the intermittent operation, instructing the motor to regenerate power on a condition that it is determined that the abnormality occurs in the secondary battery in the determination of whether or not the abnormality occurs, and supplying power, which is obtained by carrying out the regeneration, to the auxiliary.

A power supply system according to the second aspect of the disclosure is provided with a fuel cell, a secondary battery, a motor, an auxiliary for the fuel cell, and a controller. The controller is structured to control an intermittent operation by which execution and stoppage of power generation by the fuel cell is switched intermittently to supply power to electric power loads including the motor and the auxiliary, the controller is structured to determine whether or not an abnormality occurs in the secondary battery during the intermittent operation, instruct the motor to regenerate power on a condition that it is determined that the abnormality occurs, and supply power obtained by carrying out the regeneration to the auxiliary.

According to the first and second aspects, the disclosure provides a technology that enables the fuel cell to restart power generation even when an abnormality occurs in the secondary battery during the intermittent operation.

BRIEF DESCRIPTION OF THE DRAWINGS

Features, advantages, and technical and industrial significance of exemplary embodiments will be described below with reference to the accompanying drawings, in which like numerals denote like elements, and wherein.

DETAILED DESCRIPTION OF EMBODIMENTS

The embodiment of the disclosure is described in detail below with reference to the drawings. However, the scope of the disclosure is not limited to the embodiment.

Figure 1:
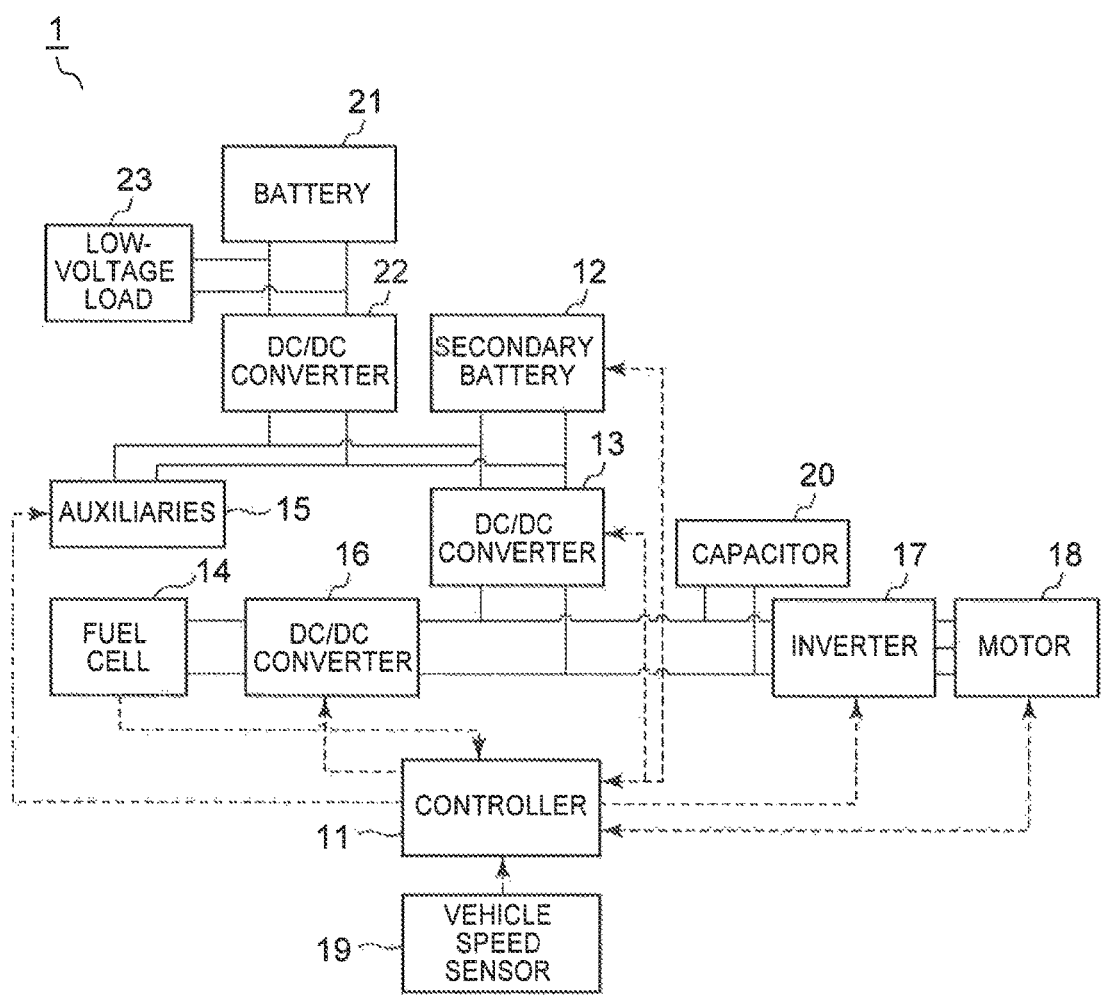
FIG. 1 is a view showing a schematic structure of a power supply system according to an embodiment.

[A structure of a power supply system] With reference to FIG. 1, an example of a schematic structure of a power supply system according to the embodiment of the disclosure is explained. The power supply system 1 is provided with a controller 11, a secondary battery 12, a DC/DC converter 13, a fuel cell 14, auxiliaries 15, a DC/DC converter 16, an inverter 17, a motor 18, a vehicle speed sensor 19, a capacitor 20, a battery 21, a DC/DC converter 22, and a low-voltage load 23. The power supply system 1 may be mounted on a vehicle (a moving body) such as a fuel cell vehicle (FCV), an electric vehicle, and a hybrid vehicle. FIG. 1 shows only a main structure included in the power supply system 1, and the power supply system 1 may also include other structures provided in a general power supply system.

The secondary battery 12 is an electricity storage part that is able to charge and discharge electricity. For example, the secondary battery 12 is made from a lithium ion battery, a nickel metal hydride battery, or a capacitor. The secondary battery 12 is inserted in a discharge path of the fuel cell 14 and connected with the fuel cell 14 in parallel with respect to the inverter 17. Also, the secondary battery 12 is connected with the auxiliaries 15.

The DC/DC converter 13 is a DC voltage converter provided between the secondary battery 12 and the inverter 17. The DC/DC converter 13 is, for example, a full bridge converter including four power transistors and a dedicated drive circuit (both of them are not shown). The DC/DC converter 13 steps up or steps down DC voltage of power supplied from the secondary battery 12 and outputs it to the fuel cell 14 side or the inverter 17 side. Also, the DC/DC converter 13 steps up or steps down DC voltage of power supplied from the fuel cell 14 and outputs it to the secondary battery 12. This means that the DC/DC converter 13 enables the secondary battery 12 to charge and discharge.

The fuel cell 14 is structured by including a solid polymer electrolyte-type cell stack that is made by laminating a plurality of cells (single cells, each of which has an anode, a cathode, and an electrolyte (power generation bodies)) in series. While the fuel cell 14 is operating in normal power generation, an oxidation reaction expressed by formula (1) occurs in the anode, and a reduction expressed by formula (2) occurs in the cathode. The fuel cell 14, as a whole, generates power as a result of an electromotive reaction expressed by formula (3).

$$H_2 \rightarrow 2H^+ + 2e^- \quad \text{Formula (1)}$$

$$(\tfrac{1}{2})O_2 + 2H^+ + 2e^- \rightarrow H_2O \quad \text{Formula (2)}$$

$$H_2 + (\tfrac{1}{2})O_2 \rightarrow H_2O \quad \text{Formula (3)}$$

The auxiliaries 15 are various kinds of equipment used for an operation of the fuel cell 14. The auxiliaries 15 include, for example, a compressor and a pump for supplying fuel gas and oxidant gas to the fuel cell 14. The auxiliaries 15 use power supplied from the secondary battery 12 or the fuel cell 14 as their drive power. Power supply from the fuel cell 14 to the auxiliaries 15 is carried out through the DC/DC converter 13 and the DC/DC converter 16.

The DC/DC converter 16 is a DC voltage converter provided between the fuel cell 14 and the inverter 17. The DC/DC converter 16 is made from a full bridge converter or the like. The DC/DC converter 16 steps up or steps down DC voltage of power supplied from the fuel cell 14 and outputs it to the inverter 17.

The inverter 17 is, for example, a PWM (pulse-width modulation) inverter including a plurality of switching elements. The inverter 17 converts direct current power supplied from the fuel cell 14 or the secondary battery 12 into three-phase alternating current power in accordance with a control command input from the controller 11, and supplies the converted power to the motor 18.

The motor 18 is a traction motor for driving wheels and so on of the moving body on which the power supply system 1 is mounted. As its drive power, the motor 18 uses power supplied from the fuel cell 14 or the secondary battery 12 through the inverter 17. The number of revolutions of the motor 18 is controlled by the inverter 17. The motor 18 is able to regenerate power in accordance with the revolutions. With the regenerated power, it is possible to charge the secondary battery 12 and the capacitor 20.

The vehicle speed sensor 19 is a sensor that detects moving speed (vehicle speed) of the moving body on which the power supply system 1 is mounted, and outputs the detected speed to the controller 11. The vehicle speed sensor 19 detects moving speed in accordance with the number of revolutions of the motor 18, the number of revolutions of the wheels of the moving body, and so on.

The capacitor 20 is an electricity storage part in which regenerated power of the motor 18 is stored (a connecting cable between the capacitor 20 and the motor 18 is now shown). The capacitor 20 also smoothens current output from the DC/DC converter 13 and the DC/DC converter 16 and outputs the current to the inverter 17. The rest of the roles of the capacitor 20 are described later. The capacitor 20 may be structured from arbitrary electricity storage means.

The battery 21 is an electricity storage part that is able to charge and discharge. For example, the battery 21 is a lithium ion battery, a nickel metal hydride battery, or a capacitor. The battery 21 is used as a power source for relatively low-voltage (for example, 12V) electrical equipment, such as the low-voltage load 23 and the controller 11.

The DC/DC converter 22 is a DC voltage converter connected between the secondary battery 12 and the auxiliaries 15. The DC/DC converter 22 is a full bridge converter or the like. The DC/DC converter 22 steps down DC voltage of power supplied form the secondary battery 12 and outputs it to the battery 21. Thus, the battery 21 is charged.

The low-voltage load 23 is an auxiliary such as in-vehicle lights and an air conditioner, which is operated by drive power at relatively low voltage (for example, 12V).

The controller 11 includes a computer provided with a CPU (central processing unit), a ROM (read only memory), and a RAM (random access memory). The controller 11 controls processing and an operation of each constituent of the power supply system 1 based on signals input from other structures, programs stored in a storage part such as the RAM, and so on. Power for operating the controller 11 is supplied from the battery 21 (a connecting cable between the controller 11 and the battery 21 is not shown for convenience).

For example, the controller 11 controls an intermittent operation in which switching is done intermittently between execution and stoppage of power generation by the fuel cell 14 for supplying power to electric power loads including the motor 18 and the auxiliaries 15. The intermittent operation is controlled in accordance with electric power required by the electric power loads, a power accumulation ratio of the secondary battery 12, and so on. For example, the controller 11 first calculates power required by the electric power loads including the motor 18 and the auxiliaries 15, and specifies a power accumulation ratio of the secondary battery 12. Next, the controller 11 determines whether or not the calculated required power is covered by power supply from the secondary battery 12, and carries out control so that power generation by the fuel cell 14 is stopped when it is covered, and that the secondary battery 12 supplies power to the motor 18, the auxiliaries 5 and so on. When the power supply from the secondary battery 12 does not cover the required power, the controller 11 carries out control so that the fuel cell 14 generates power, and that the fuel cell 14 and the secondary battery 12 supply power. A System-on-a-Chip (SOC) may be used as a structure that determines whether or not the calculated required power is covered by power supplied from the secondary battery 12.

Here, during the intermittent operation, when an abnormality occurs in the secondary battery 12, connection between the secondary battery 12 and the auxiliaries 15 can be shut off, or the secondary battery 12 may not be able to supply power. In such a case, even when one tries to perform control to change the fuel cell 14 from a non-power generating state (non-operating state) to a power generating state, it is not possible to supply power from the secondary battery 12 to the auxiliaries 15 in order to cause the fuel cell 14 to restart its operation. As a result, it is not possible to drive the auxiliaries 15, and the fuel cell 14 cannot be operated either. Unless the fuel cell 14 is operated, the motor 18 cannot be driven either, and it becomes impossible for the moving body, on which the power supply system 1 is mounted, to continue travelling.

In order to avoid this situation, in this embodiment, the controller 11 first determines whether or not an abnormality occurs in the secondary battery 12 during the intermittent operation. On the condition that it is determined that an abnormality occurs, the controller 11 is able to perform control so that the motor 18 is instructed to regenerate power. In accordance with the instruction, the motor 18 regenerates power. The controller 11 performs control so that the capacitor 20 is charged by regenerated power obtained from the motor 18. Thereafter, the auxiliaries 15 are activated by power discharged from the capacitor 20 (a connecting cable between the capacitor 20 and the auxiliaries 15 is not shown), and it is possible to start driving the fuel cell 14 by driving the auxiliaries 15.

An abnormality of the secondary battery 12 is detected in accordance with a control signal received by the controller 11 from the secondary battery 12 or the DC/DC converter 13, or by the fact that the control signal is not received.

As stated so far, according to this embodiment, on the condition that an abnormality occurs in the secondary battery 12 during the intermittent operation, the motor 18 starts regenerating power. This means that, even in a state where power regeneration is not supposed to be carried out (for example, while a vehicle is going downhill), the motor 18 starts regenerating power when an abnormality occurs in the secondary battery 12 during the intermittent operation. Therefore, according to this embodiment, even when an abnormality occurs in the secondary battery 12 during the intermittent operation, regenerated power obtained from the motor 18 is supplied as drive power for the auxiliaries 15, thereby making it possible to restart an operation of the fuel cell 14.

Depending on the number of revolutions of the motor 18, or moving speed of the moving body on which the power supply system 1 is mounted, there are instances where sufficient power for starting an operation of the fuel cell 14 is not generated from the regeneration. When sufficient power for starting an operation of the fuel cell 14 is not generated even after regeneration is carried out as stated above while the moving body is traveling, a distance of inertia travel becomes short. Therefore, a distance that the moving body is able to travel in order to evacuate to a safe location becomes short. In consideration of these points, the controller 11 is able to perform control so that the regeneration is carried out when it is possible to generate sufficient power for starting an operation of the fuel cell 14 from the regeneration as described later.

First, when an abnormality occurs in the secondary battery 12 during the intermittent operation, the controller 11 calculates power that can be generated by the regeneration carried out by the motor 18. Power that can be generated by the regeneration is calculated based on, for example, moving speed (vehicle speed) detected by the vehicle speed sensor 19. In this case, the controller 11 stores a formula for calculating power that can be generated by the regeneration based on moving speed, or a map that represents a relation between moving speed and power that can be generated, and the controller 11 is able to use the formula or the map in order to calculate power that can be generated.

The controller 11 performs control so that the motor 18 regenerates power when power that can be generated is a given value or larger. The given value is set to be a value that is larger than power required by the auxiliaries 15 to start an operation of the fuel cell 14. For example, it is possible to set the given value to a value larger than power that is obtained by adding loss power to the power necessary to start an operation of the fuel cell 14. The loss power is power required to recover the power necessary to start an operation of the fuel cell 14. This means that, the controller 11 is able to perform control so that the motor 18 regenerates power when power obtained by deducting at least loss power from power that can be generated by regeneration is power that allows the auxiliaries 15 to start operating the fuel cell 14 or larger. The loss power is power required to recover the power that can be generated by regeneration.

As stated earlier, according to this embodiment, the controller 11 is able to carry out control to make the regeneration occur when the regeneration produces sufficient power for starting an operation of the fuel cell 14. As a result, by performing regeneration of power, it is possible to prevent a distance of inertia travel from becoming short even when sufficient power for starting an operation of the fuel cell 14 is not generated.

Figure 2:
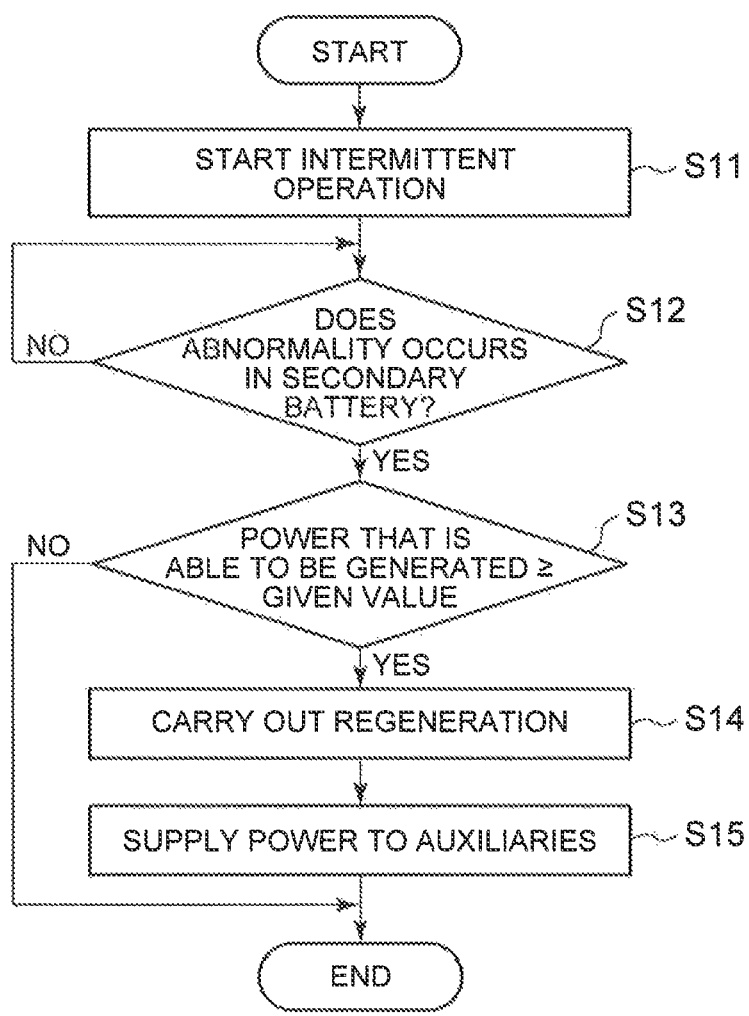
FIG. 2 is a flowchart showing a flow of processing conducted by the power supply system according to the embodiment.

[A control flow of power supply] With reference to FIG. 2, a processing flow of power supply carried out by the power supply system 1 is explained. This processing is controlled by the controller 11. The details of the processing are omitted as they are already explained.

First, in step S11, the controller 11 starts an intermittent operation in which execution and stoppage of power generation by the fuel cell 14 is switched intermittently in order to supply power to the electric power loads including the motor 18 and the auxiliaries 15.

In step S12, the controller 11 determines whether or not an abnormality occurs in the secondary battery 12. For example, an abnormality in the secondary battery 12 is detected in accordance with a control signal received by the controller 11 from the secondary battery 12 or the DC/DC converter 13, or the fact that the control signal is not received. When it is determined that an abnormality occurs, the processing moves on to step S13.

In step S13, the controller 11 calculates power that can be generated by regeneration carried out by the motor 18, and determines whether or not the power that can be generated is a given value or larger. For example, the power that can be generated by the regeneration is calculated based on moving speed detected by the vehicle speed sensor 19. When it is determined that the power that can be generated is the given value or larger (Yes in S13), the processing moves on to step S14. Otherwise (No in S13), the processing shown in FIG. 2 ends.

In step S14, the controller 11 performs control so that an instruction for the motor 18 to regenerate power is output. Thereafter, the processing moves on to step S15. When it is determined in step S13 that power that can be generated is smaller than the given value, the regeneration does not occur. In step S15, regenerated power is supplied to the auxiliaries 15, and the auxiliaries 15 cause the fuel cell 14 to operate.

As stated above, according to this embodiment, even when an abnormality occurs in the secondary battery 12 during the intermittent operation, regenerated power obtained from the motor 18 is supplied as drive power for the auxiliaries 15, and power supply continues in order to start an operation of the fuel cell 14.

Further, according to this embodiment, the controller 11 is able to perform control so that regeneration is carried out when sufficient power can be generated from the regeneration for starting an operation of the fuel cell 14. As a result, by regenerating power, it is possible to prevent a distance of inertia travel from becoming short even when sufficient power for starting an operation of the fuel cell 14 is not generated.

The embodiment of the disclosure has been explained so far with reference to the drawings. However, the scope of the disclosure is not limited to the embodiment. It is obvious that a person skilled in the art will arrive at various changes and modifications within the category described in the scope of claims, and those changes and modifications fall into the technical scope of the disclosure.

What is claimed:

1. A power supply method carried out in a system that includes a fuel cell, a secondary battery, a motor, and an auxiliary for the fuel cell, the method comprising:
controlling an intermittent operation by which execution and stoppage of power generation by the fuel cell is switched intermittently to supply power to electric power loads including the motor and the auxiliary;
determining whether or not an abnormality occurs in the secondary battery during the intermittent operation;
instructing the motor to regenerate power on a condition that it is determined that the abnormality occurs in the secondary battery in the determination of whether or not the abnormality occurs; and
supplying power, which is obtained by carrying out the regeneration, to the auxiliary.

2. The power supply method according to claim 1, further comprising
calculating power that is able to be generated by the regeneration carried out by the motor when it is determined that the abnormality occurs in the secondary battery during the intermittent operation when it is determined whether or not the abnormality occurs, wherein
the regeneration is carried out when the power that is able to be generated is a given value or larger.

3. The power supply method according to claim 2, further comprising
measuring moving speed of a moving body on which the system is mounted,
wherein the power that is able to be generated is calculated based on the moving speed measured.

4. The power supply method according to claim 2, wherein the instruction to carry out the regeneration is given when power, which is obtained by deducting at least loss power from the power that is able to be generated, is power that allows the auxiliary to make the fuel cell start operating or larger, the loss power being required to recover the power that is able to be generated.

5. The power supply method according to claim 1, wherein power obtained by carrying out the regeneration is stored in a capacitor.

6. A power supply system, comprising:
a fuel cell;
a secondary battery;
a motor;
an auxiliary for the fuel cell; and
a controller, the controller being structured to control an intermittent operation by which execution and stoppage of power generation by the fuel cell is switched intermittently to supply power to electric power loads including the motor and the auxiliary, the controller being structured to determine whether or not an abnormality occurs in the secondary battery during the intermittent operation, instruct the motor to regenerate power on a condition that it is determined that the abnormality occurs, and perform control so that power obtained by carrying out the regeneration is supplied to the auxiliary.

7. The power supply system according to claim 6, wherein the controller is structured to calculate power that is able to be generated by the regeneration carried out by the motor when it is determined that the abnormality occurs in the secondary battery during the intermittent operation when it is determined whether or not the abnormality occurs, and is also structured to cause the motor to carry out the regeneration when the power that is able to be generated is a given value or larger.

8. The power supply system according to claim 7, further comprising a vehicle speed sensor that measures moving speed of a moving body on which the power supply system is mounted,
wherein the controller is structured to calculate the power that is able to be generated based on the moving speed measured.

9. The power supply system according to claim 7, wherein the controller is structured to carry out the regeneration when power, which is obtained by deducting at least loss power from the power that is able to be generated, is power that allows the auxiliary to make the fuel cell start operating or larger, the loss power being required to recover the power that is able to be generated.

10. The power supply system according to claim 6, further comprising a capacitor that stores power obtained by carrying out the regeneration.

* * * * *